US012643007B1

(12) United States Patent
Benckendorf

(10) Patent No.: US 12,643,007 B1
(45) Date of Patent: Jun. 2, 2026

(54) VERTICAL SUPPORT EXERCISE DEVICE

(71) Applicant: Eric Benckendorf, Saint Louis, MO (US)

(72) Inventor: Eric Benckendorf, Saint Louis, MO (US)

(*) Notice: Subject to any disclaimer, the term of this patent is extended or adjusted under 35 U.S.C. 154(b) by 64 days.

(21) Appl. No.: 18/977,139

(22) Filed: Dec. 11, 2024

(51) Int. Cl.
*A63B 21/00* (2006.01)
*A61H 3/04* (2006.01)
*A63B 22/02* (2006.01)

(52) U.S. Cl.
CPC ........... *A63B 21/4035* (2015.10); *A61H 3/04* (2013.01); *A63B 22/02* (2013.01); *A61H 2003/046* (2013.01); *A61H 2201/0107* (2013.01); *A61H 2201/1635* (2013.01); *A63B 2225/093* (2013.01)

(58) Field of Classification Search
CPC ................ A63B 21/4035; A63B 22/02; A63B 2225/093; A63B 21/4027; A63B 21/4033; A61H 3/04; A61H 2003/046; A61H 2201/0107; A61H 2201/1635
See application file for complete search history.

(56) References Cited

U.S. PATENT DOCUMENTS 4,907,794 A * 3/1990 Rose ........................ A61H 3/04 280/43.24
6,279,591 B1 8/2001 Obitts
8,540,256 B1 9/2013 Simpson
10,583,065 B1 3/2020 Mejia
10,639,226 B1 5/2020 Keyes et al.
10,864,132 B1 * 12/2020 Bingham ................ A61H 3/00
11,569,860 B2 * 1/2023 Gu ......................... A47B 23/06
11,925,831 B2 * 3/2024 Johnson, III ....... A63B 23/1209
2002/0050697 A1 * 5/2002 Hallgrimsson ...... A61G 5/0891 280/87.051
2004/0245737 A1 * 12/2004 Hallgrimsson ...... A61G 5/0883 280/87.01
2007/0163633 A1 * 7/2007 Gale ........................ A61H 3/04 280/87.021
2008/0079230 A1 * 4/2008 Graham .................. A61G 5/08 280/87.041
2009/0075784 A1 3/2009 Hoggan
2011/0230800 A1 * 9/2011 Binns .................. A61H 1/0281 601/5
2015/0173994 A1 * 6/2015 Chen ........................ A61H 3/00 280/639

(Continued)

*Primary Examiner* — Andrew S Lo
(74) *Attorney, Agent, or Firm* — Cramer Patent & Design, PLLC.; Aaron R. Cramer

(57) ABSTRACT

A vertical support device is disclosed for providing ergonomic support to users engaged with personal utility devices such as treadmills and rolling walkers. The device includes an upper assembly with adjustable hand grips, forearm supports, and an abdomen support sling, all mounted on upper assembly arms with first and second adjustment mechanisms for customized positioning. The upper assembly connects to a lower assembly comprising a crossbar, lower assembly arms, mounting bases with clamp mechanisms, and width and height adjustment mechanisms to accommodate varying device sizes and user heights. Angular adjustment is enabled by upper angle supports and lower angle supports with aligned pivot holes and locking holes. The device facilitates reduced impact exercise and improved stability, enhancing usability across a range of personal utility devices.

10 Claims, 4 Drawing Sheets

(56) References Cited

U.S. PATENT DOCUMENTS

| | | | | |
|---|---|---|---|---|
| 2015/0216757 | A1* | 8/2015 | Powell | A61H 3/04 296/1.09 |
| 2015/0335940 | A1* | 11/2015 | Johnson | A63B 21/4045 248/118 |
| 2016/0096064 | A1 | 4/2016 | Gatti | |
| 2017/0326407 | A1* | 11/2017 | Johnson | A63B 22/203 |
| 2018/0250189 | A1* | 9/2018 | Johnson | A61H 3/04 |
| 2019/0105221 | A1* | 4/2019 | Pan | A61G 5/08 |
| 2019/0105222 | A1* | 4/2019 | Fellingham | A61H 1/00 |
| 2019/0160327 | A1* | 5/2019 | Wilson | A63B 1/005 |
| 2020/0155408 | A1 | 5/2020 | Fathi | |
| 2022/0151860 | A1* | 5/2022 | Shugert | A63B 23/03541 |
| 2022/0233911 | A1* | 7/2022 | Johnson, III | A63B 22/0012 |
| 2023/0029427 | A1* | 1/2023 | Karlovich | A61N 1/36003 |

* cited by examiner

VERTICAL SUPPORT EXERCISE DEVICE

RELATED APPLICATIONS

None.

FIELD OF THE DEVICE

The present device relates to the field of assistive devices and exercise equipment, specifically to support devices configured for coupling to personal utility devices such as treadmills, rolling walkers, and similar equipment to provide ergonomic support during physical activity.

BACKGROUND OF THE DEVICE

Many individuals face challenges in engaging with exercise or mobility equipment due to physical limitations such as joint pain, back problems, or recovery from surgery or illness. Conventional devices often lack sufficient adjustability, versatility, or stability to accommodate users with varying needs. For example, prior art such as the Posture-Correcting Walker (U.S. Pat. No. 10,583,065) provides guiding forearm supports and angled stabilizing segments to encourage proper posture during ambulation but does not offer the flexibility to integrate with multiple types of personal utility devices or support dynamic exercise needs. Similarly, the Wheeled Walker with a Movable Seat (US20190105221) includes sliding seats and forearm gutters for upright walking, but its functionality is limited to walking assistance and lacks adaptable angular positioning or robust abdominal support.

The Up-Right Walker (U.S. Pat. No. 8,540,256) and Ergonomic Walker (US 20200155408) address upright posture through forearm cradles and height-adjustable frames but fail to provide integrated solutions for low-impact exercise or versatile configurations for different devices. Additionally, the Mobility Assistance Device (U.S. Pat. No. 10,639,226) enhances stability by distributing weight across forearms but lacks sufficient customization options for varying exercise postures or the ability to integrate with stationary equipment like treadmills.

More specialized prior art, such as the Universal Platform Support for a Walker (U.S. Pat. No. 6,279,591), provides vertical and horizontal adjustments but does not address dynamic postures or incorporate abdominal support. Treadmill-specific devices like the Treadmill Cross Training Conversion (US20090075784) and the Treadmill with Removable Handles (US201600960604) offer limited support mechanisms and focus primarily on hand or arm exercises rather than providing comprehensive, low-impact full-body support.

The device of the present application overcomes the limitations of these prior devices by combining comprehensive adjustability with compatibility for a wide range of personal utility devices, such as treadmills and rolling walkers. The inclusion of adjustable hand grips, forearm supports, and an abdomen support sling ensures ergonomic alignment and stability for users of varying sizes and needs. Its integrated upper and lower assemblies enable angular positioning, height adjustments, and secure attachments to personal utility devices, accommodating low-impact exercise, physical therapy, and mobility assistance in a versatile, user-centered design. This novel combination of features addresses the shortcomings of the prior art by enhancing usability, flexibility, and functionality across different contexts and user requirements.

SUMMARY OF THE DEVICE

Embodiments of the present disclosure may include a vertical support device configured for coupling to a personal utility device. The device may comprise an upper assembly including a pair of hand grips, each equipped with a hand brake, a pair of forearm supports, and an abdomen support sling.

The upper assembly may further include a pair of upper assembly arms, each having a first adjustment mechanism and a second adjustment mechanism to allow customizable positioning of the pair of hand grips, the pair of forearm supports, and the abdomen support sling. The device may also include a lower assembly comprising a crossbar.

The lower assembly may include a pair of lower assembly arms extending from the crossbar and a pair of mounting bases located at the terminal ends of the lower assembly arms, each equipped with a clamp mechanism for secure attachment to the personal utility device. Additionally, the device may include a width adjustment mechanism to adjust the spacing of the lower assembly arms.

The device may also feature a height adjustment mechanism for adjusting the height of the lower assembly relative to the personal utility device. A pair of upper angle supports may be connected to the upper assembly arms, each including a first central pivot hole and a plurality of angle adjustment holes.

Similarly, the device may include a pair of lower angle supports connected to the lower assembly arms, each featuring a second central pivot hole and a plurality of angle locking holes. A set of fasteners may be configured to align and secure the first central pivot holes to the second central pivot holes, as well as the angle adjustment holes to the angle locking holes, enabling adjustable angular positioning of the upper assembly relative to the lower assembly.

In some embodiments, each clamp mechanism may include one or more of a friction fit, a threaded clamp, a temporary adhesive, a ratchet strap, or a mechanical fastener. The width adjustment mechanism and the height adjustment mechanism may include sliding members and locking means to accommodate users of varying sizes and personal utility devices of different dimensions.

The abdomen support sling may be constructed from a flexible material to provide ergonomic support for a user's midsection during use. The pair of forearm supports may be adjustable to allow a user to maintain a range of postures, including inclined and upright positions.

The device may be configured for integration with a treadmill and may include the pair of mounting bases adapted to attach to the support arms of the treadmill. Alternatively, the device may be configured for integration with a rolling walker and may include vertical uprights, a pair of larger rear tires, a single front tire, a seat, and a storage pouch.

The set of fasteners may be selected from the group consisting of bolts, screws, pins, and cotter pins. The plurality of angle adjustment holes and the plurality of angle locking holes may allow for adjustment along an angular adjustment path to enable varying degrees of support for different exercise postures. Finally, the pair of hand grips and the pair of forearm supports may be positioned to reduce impact on a user's lower body while facilitating spinal decompression during exercise.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
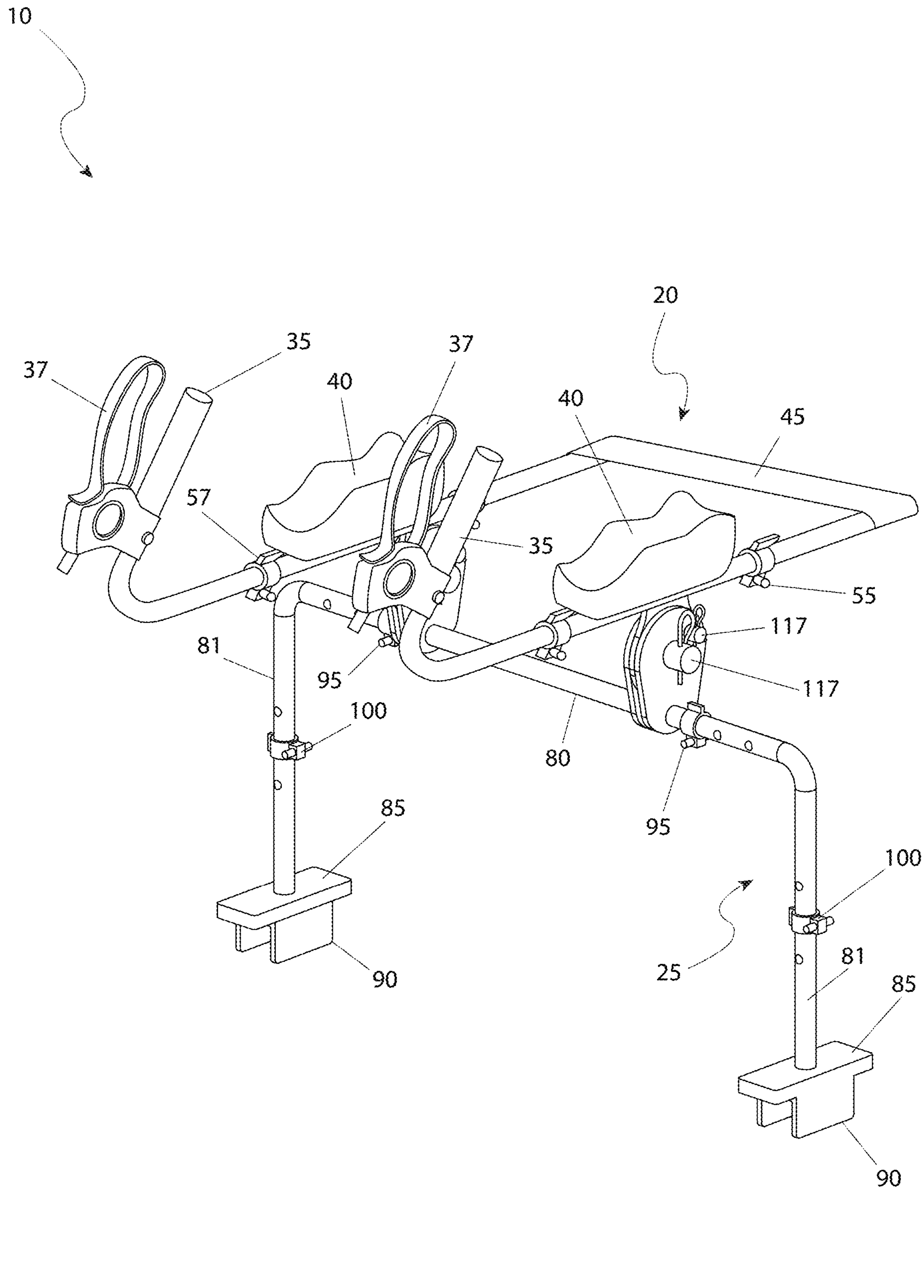
FIG. 1 is a perspective view of a vertical support device 10 configured for coupling to a personal utility device equipment (e.g., a treadmill 120, a rolling walker 130), according to the preferred embodiment of the present invention.

10 vertical support device
20 upper assembly
25 lower assembly
35 hand grip
37 hand brake
40 forearm support
45 abdomen support sling
50 upper assembly arm
55 first adjustment mechanism
57 second adjustment mechanism
60 upper angle support
65 first central pivot hole
70 angle adjustment hole
75 angular adjustment path "a"
80 crossbar
81 lower assembly arm
85 mounting base
90 clamp mechanism
95 width adjustment mechanism
100 height adjustment mechanism
105 lower angle support
110 second central pivot hole
115 angle locking hole
117 fastener
120 treadmill
125 support arm
130 rolling walker
135 vertical upright
140 rear tire
145 front tire
150 seat
155 storage pouch

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of a vertical support device 10 according to the preferred embodiment of the present invention, is disclosed. The vertical support device (herein also described as the "device") 10, provides for a supporting functionality to a portion of a user's weight while in a semi-standing position, when coupled to a personal utility device (e.g., a treadmill 120, a rolling walker 130, a baby stroller). The features of the device 10 cater to those seeking low-impact exercise, and is especially beneficial for individuals with knee and back issues. The device 10 comprises primarily of an upper assembly 20 and a lower assembly 25, which will both be detailed in greater detail herein below.

The upper assembly 20 is provided with a pair of hand grips 35 each having a hand brake 37, a pair of forearm supports 40, and an abdomen support sling 45 which may be held by the user's hands as an additional means of support. The adjustable length hand grips 35, the adjustable length forearm supports 40, and the adjustable length abdomen support sling 45 provide adjustable-angle forearm supports positioned higher than those on a standard personal utility device, thus allowing users to lean on their forearms at varying inclines. This posture promotes hang board strengthening or plank positions that distribute body weight and utilize gravity to decompress the spine. The adaptable nature of the device 10 accommodates users of different fitness levels, offering breaks by resting on the abdomen support sling 45. The features of the device 10 cater to those seeking low-impact exercise, and is especially beneficial for individuals with knee and back issues, or those recovering from illness, surgery, or undergoing other forms of physical therapy.

Figure 2:
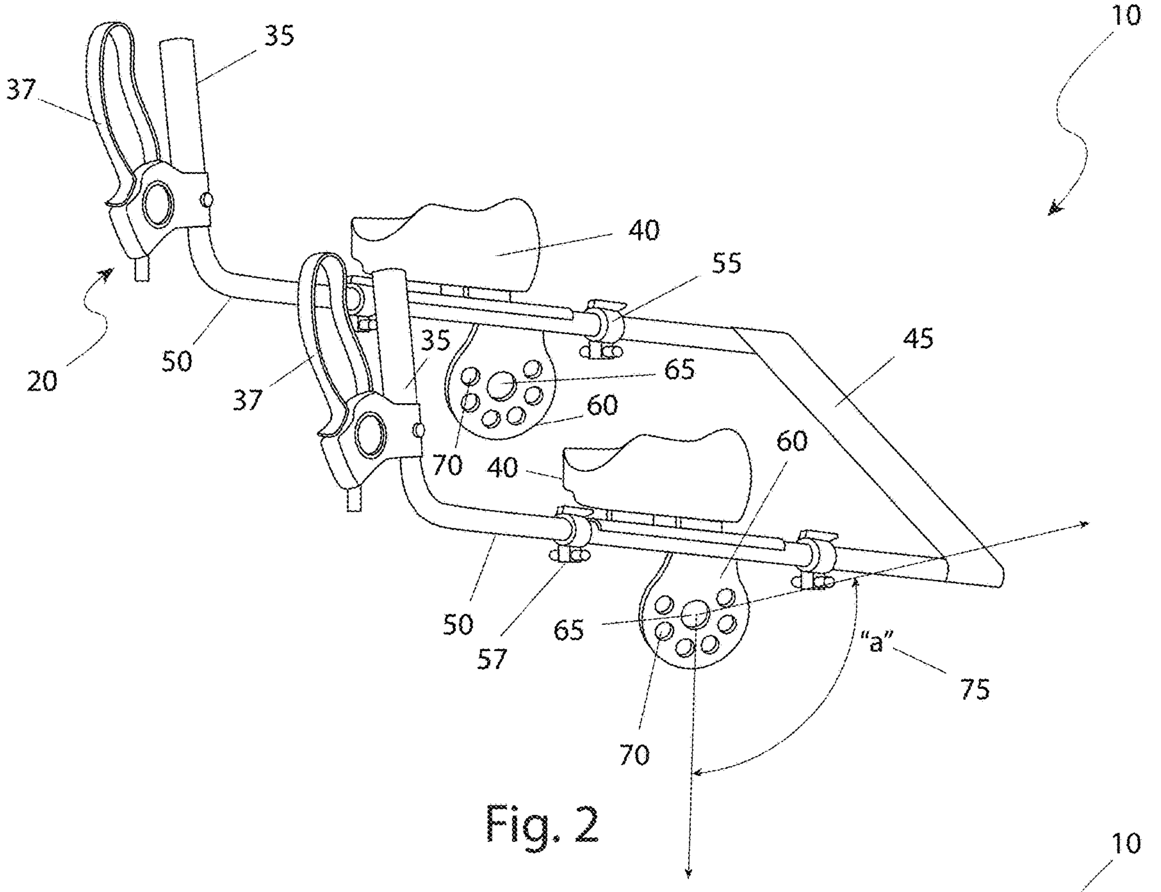
FIG. 2 is a perspective view of an upper assembly 20, as used with the vertical support device 10, according to the preferred embodiment of the present invention.

Referring next to FIG. 2, a perspective view of the upper assembly 20 as used with the device 10, according to the preferred embodiment of the present invention is depicted. The upper assembly 20 includes two (2) generally L-shaped members that include an upper assembly arm 50 and a hand grip 35. Each hand grip 30 supports an individual hand brake 37. Each upper assembly arm 50 supports an individual forearm support 40. Terminal ends of the upper assembly arms 50 serve as a joint support for the abdomen support sling 45. Both of the upper assembly arms 50 are provided with a first adjustment mechanism 55 and a second adjustment mechanism 57 to adjust the overall length thereof, and thus the placement of, the abdomen support sling 45, and hand grips 35, respectively. This provides a means to accommodate individuals of different sizes.

Additionally, each upper assembly arm 50 is supplied with an upper angle support 60 along its lower surface. The upper angle support 60 attaches to the lower assembly 25 as will be detailed herein below. The upper angle support 60 is provided with a first central pivot hole 65 along with angle adjustment holes 70 to allow for adjustment along an angular adjustment path "a" 75 to adjust the degree of hang board vs. plank position. The use of any particular type or style of upper angle support 60 is not intended to be a limiting factor of the device 10.

Figure 3:
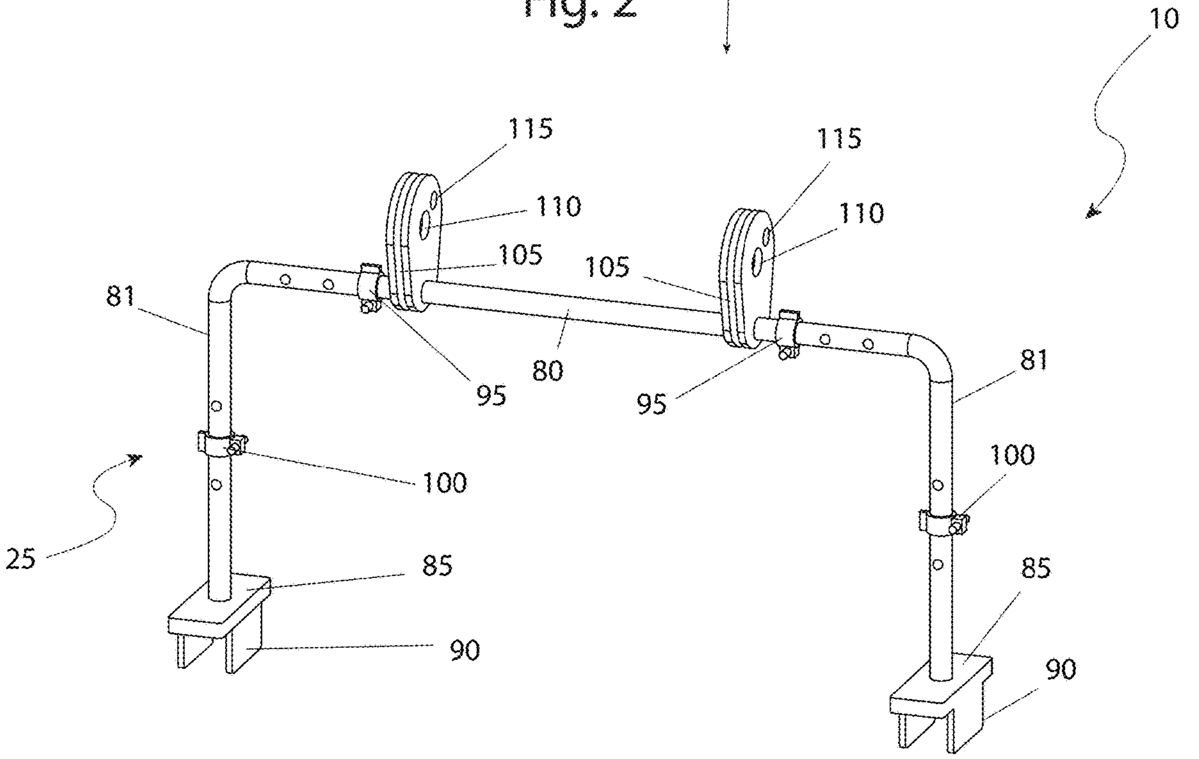
FIG. 3 a perspective view of a lower assembly 25, as used with the vertical support device 10, according to the preferred embodiment of the present invention.

Referring now to FIG. 3, a perspective view of the lower assembly 25 as used with the device 10, according to the preferred embodiment of the present invention is shown. The lower assembly 25 includes a generally inverted U-shaped frame including a crossbar 80 having a lower assembly arm 81 located at terminal ends thereof. The opposing ends of the lower assembly arms 81 each have a mounting base 85 located thereat. Each mounting base 85 is equipped with a clamp mechanism 90 that adapts to the personal utility device upon which the device 10 is utilized. The clamp mechanisms 90 may be a friction fit, a threaded clamp, a temporary adhesive, a ratchet strap, a mechanical fastener, or the like. The use of any particular type or style of clamp mechanisms 90 is not intended to be a limiting factor of the present invention. The crossbar 80 is also equipped with multiple width adjustment mechanisms 95 to allow the lower assembly 25 to adjust to different widths to accommodate different sizes and storage space such a personal utility device would take. The lower assembly arms 81 are also equipped with multiple height adjustment mechanisms 100 to accommodate users of different heights, thus allowing for user customization.

The lower assembly 25 is provided with two (2) lower angle supports 105 which mate with the upper assembly arms 50 as shown in FIG. 2 to produce the angular adjustment path "a" 75 (as shown in FIG. 2). Each lower angle support 105 includes a pair of plates having a second central pivot hole 110 and an angle locking hole 115 located adjacent the central pivot hole 65. Each upper angles support 60 may be placed within the gap between the adjacent plates of an individual lower angle support 105. The second central pivot holes 110 correspondingly align and mate with the first central pivot holes 65 (as shown in FIG. 3) using a fastener 117, envisioned to be a mechanical fastening means such as a bolt and nut, screw, pin and cotter pin, or the like (not shown). The exact type of fastener 117 is not intended to be a limiting factor of the present invention. Likewise the angle locking holes 115 correspondingly align and mate with the angle adjustment holes 70 (as shown in FIG. 3) using a separate fastener 117 like a mechanical fastening means such as a bolt (not shown).

Figure 4:
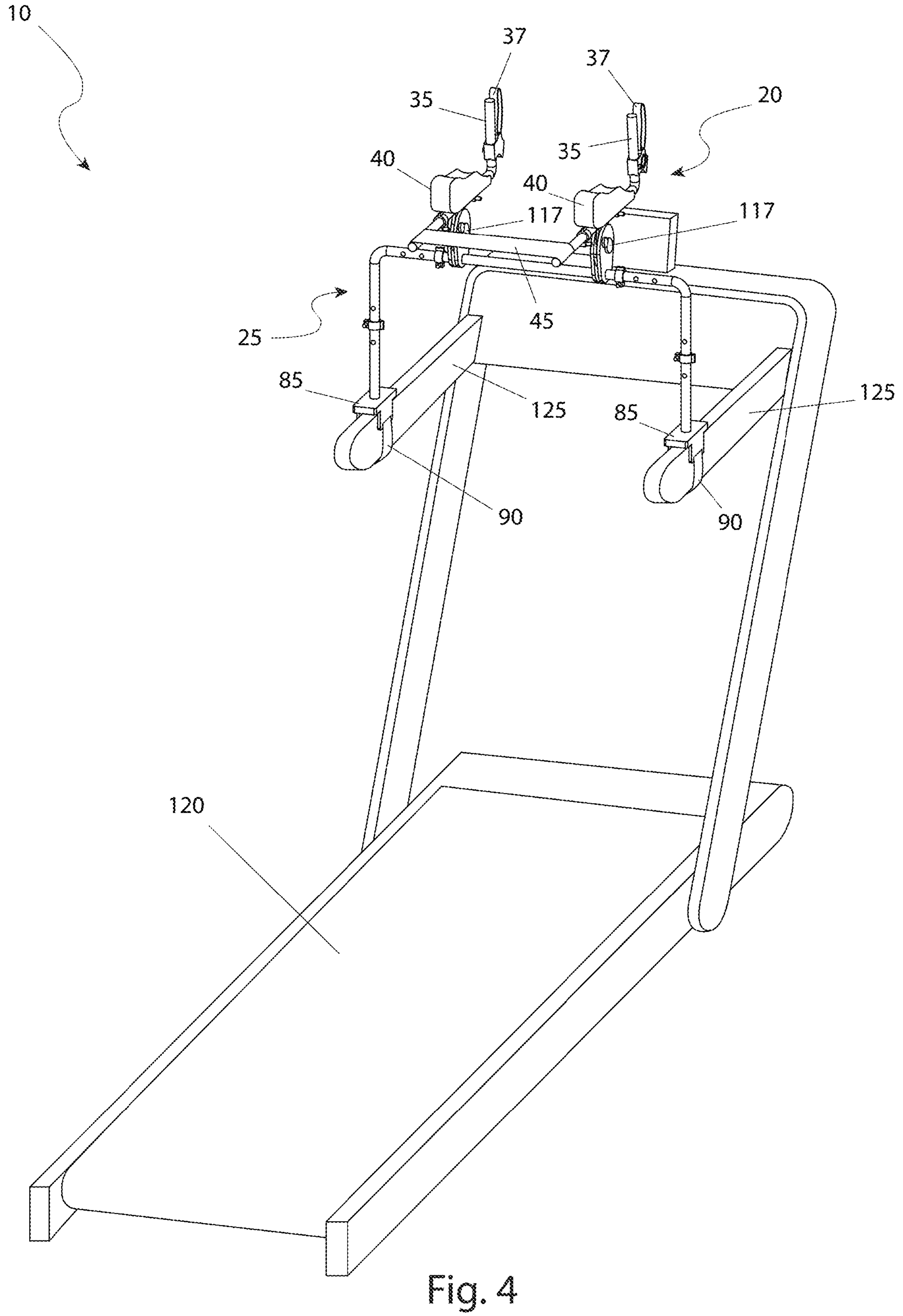
FIG. 4 is a perspective view of the vertical support device 10, installed on a treadmill 120, according to the preferred embodiment of the present invention; and, FIG. 5 is a perspective view of the vertical support device 10, manufactured an integral feature of a rolling walker 130, according to an alternate embodiment of the present invention.

Referring next to FIG. 4, a perspective view of the device 10 installed on a treadmill 120 according to the preferred embodiment of the present invention, is disclosed. The treadmill 120 is depicted as typical in nature of many conventional treadmills 120. The adjustable nature of the device 10, as provided by the first adjustment mechanism 55 and angle adjustment holes 70 (both as shown in FIG. 2), as well as the width adjustment mechanisms 95 and the height adjustment mechanisms 100 (as shown in FIG. 3), allow the device 10 to be used with a wide variety of treadmills 120. The mounting bases 85 as used with the clamp mechanisms 90 allow for attachment to the support arms 125 of the treadmill 120. In such a usage scenario, the user would walk and/or run on the treadmill 120 while the vast majority of their body weight is supported by the device 10. Such support is accomplished by placing their forearms in the forearm supports 40 while gripping the hand grips 35 for stability. Simultaneously, the midsection abdomen area of the user is supported by the abdomen support sling 45. Resultant positioning allows for the user to run easier and with low impact, while adding in core (plank/hang board) and also adding in back traction to prevent or reverse some of the damage due to repetitious and/or high impact training. Additionally, the weight of the user uses gravity to expand the spine area rather than having all of the user's weight impact the feet area resulting in spine compression. Should the need to relax even more occur, the user may reposition their forearms such that the abdomen and chest area of the user can rest upon the abdomen support sling 45, giving the arms and core of the user a rest.

Figure 5:
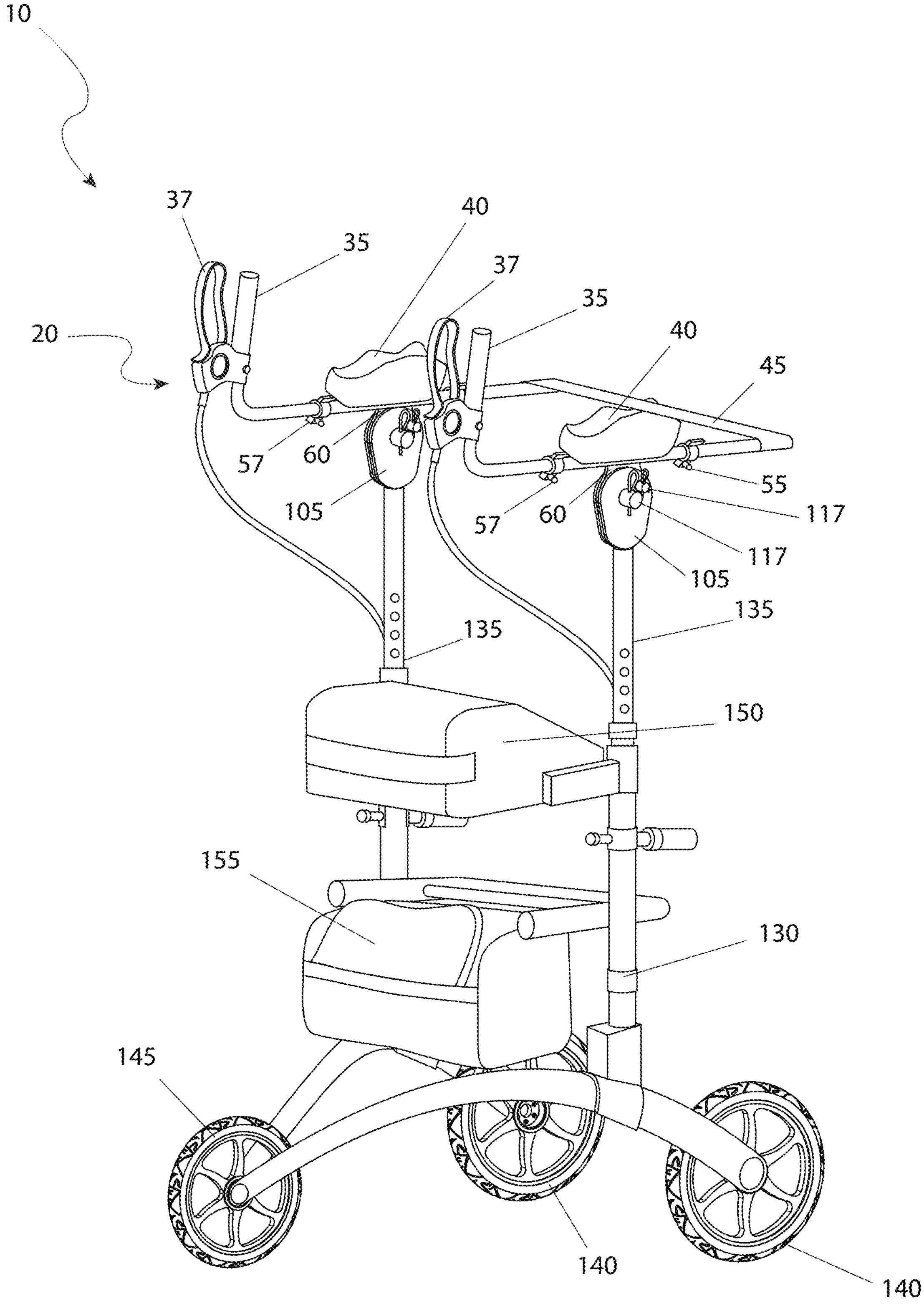

Referring to FIG. 5, a perspective view of the device 10 manufactured as an integral feature of a rolling walker 130, according to an alternate embodiment of the present invention is depicted. However, it is appreciated that the support posts are moved further back to enable stability when running. The rolling walker 130 is depicted as an otherwise generally standard design, with the exception of the conventional handle area being replaced with the upper assembly 20. The upper assembly 20 once again uses the upper angle support 60, but instead of connecting to the lower assembly 25 (as shown in FIG. 1), the upper angle support 60 attaches to a lower angle support 105 as connected to the adjustable length vertical uprights 135. Such a lower angle support 105 is envisioned to be generally identical in design and function as described above. The rolling walker 130 may be provided with larger rear tires 140 and a single front tire 145 to facilitate faster movement (such as jogging or running) over rougher grade such as when exercising. The rolling walker 130 may be provided with standard accessories such as a seat 150 and a storage pouch 155 as normally found on a conventional rolling walker 130. The hand brake 37 functionality commonly built into a conventional rolling walker 130 may be attached to the hand grips 35 of the upper assembly 20 to control movement of the rear tires 145.

In a specific embodiment the vertical support device 10, consists of all numbered elements to provide a versatile and ergonomic support solution for use with various personal utility devices, such as treadmills 120 and rolling walkers 130. The device 10 comprises an upper assembly 20 and a lower assembly 25, which are interconnected to enable adjustable and customizable support for users of varying sizes and needs.

The upper assembly 20 includes hand grips 35 equipped with hand brakes 37, forearm supports 40, and an abdomen support sling 45, all of which are mounted on upper assembly arms 50. The upper assembly arms 50 feature a first adjustment mechanism 55 and a second adjustment mechanism 57, enabling precise positioning of the hand grips 35, forearm supports 40, and abdomen support sling 45. These elements provide multiple points of support, ensuring ergonomic alignment and stability. The upper assembly arms 50 connect to upper angle supports 60, each equipped with a first central pivot hole 65 and angle adjustment holes 70, allowing for angular adjustments along an angular adjustment path "a" 75. This configuration enables the device 10 to support various exercise postures and therapeutic positions.

The lower assembly 25 consists of a crossbar 80 with lower assembly arms 81 at each end. The lower assembly arms 81 terminate in mounting bases 85, each equipped with clamp mechanisms 90, providing secure attachment to the support arms 125 of a treadmill 120 or the vertical uprights 135 of a rolling walker 130. The lower assembly 25 also includes width adjustment mechanisms 95 and height adjustment mechanisms 100, allowing the device 10 to adapt to different equipment sizes and user heights. Lower angle supports 105, integrated into the lower assembly 25, include second central pivot holes 110 and angle locking holes 115, which align with the first central pivot holes 65 and angle adjustment holes 70 of the upper angle supports 60. These components are secured with fasteners 117 to ensure a robust and adjustable connection.

In configurations where the device 10 is integrated with a rolling walker 130, additional features include larger rear tires 140, a single front tire 145, a seat 150, and a storage pouch 155 to enhance functionality and usability. The integration of these elements ensures stability, mobility, and convenience. The vertical support device 10, constructed as a comprehensive embodiment of all its numbered elements, delivers a highly adaptable, ergonomic, and stable solution for a wide range of users and personal utility devices.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as exercise equipment suppliers, medical equipment suppliers, sporting goods stores, mail order and internet supply houses and the like. Special attention would be paid to whether or not the device 10 is supplied as a component to new personal utility devices such as a treadmill 120 or rolling walker 130 or supplied as an add on kit for existing personal utility devices.

After procurement and prior to utilization, the device 10 would be installed upon the personal utility device in general accordance with FIG. 4 and FIG. 5. Such installation would be dependent on the personal utility device, and accomplished by using the upper angle support 60 on the upper assembly 20 along with the lower angle support 105 on the lower assembly 25 by aligning the first central pivot holes 65 and second central pivot holes 110 in conjunction with the angle adjustment holes 70 and the angle locking holes 115. The device 10 would be adjusted in size for the particular personal utility device as well as the user by utilization of the first adjustment mechanism 55, the width adjustment mechanisms 95, and the height adjustment mechanisms 100. At this point in time, the device 10 is ready for use.

During utilization, depending on the personal utility device being utilized, such as the treadmill 120 of FIG. 4 or the rolling walker 130 of FIG. 5, the user would manipulate the personal utility device in a conventional manner, with the exception of instead of any support being provided only by the hands, the user is now supported by their abdomen using the abdomen support sling 45, their forearms using the forearm supports 40, and their hands using the hand grips 35. This support is envisioned to allow for human locomotion such as walking, jogging, and/or running in an easier manner with lower impact, while adding in core (plank/hang board) and also adding in back traction to prevent/reverse some of the damage due to repetitious and/or high impact training. Additionally, the weight of the user benefits from gravity to expand the spine area rather than having all of the user's weight impact the feet area resulting in spine compression. Should the need to relax even more occur, the user may reposition their forearms such that the abdomen and chest area of the user can rest upon the abdomen support sling 45, giving the arms and core of the user a rest. This action may be repeated as needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vertical support device configured for coupling to a personal utility device, comprising:
- an upper assembly comprising:
  - a pair of hand grips, each hand grip equipped with a hand brake,
  - a pair of forearm supports,
  - an abdomen support sling; and,
  - a pair of upper assembly arms, each upper assembly arm having a first adjustment mechanism and a second adjustment mechanism for customizable positioning of the pair of hand grips, the pair of forearm supports, and the abdomen support sling; and,
- a lower assembly comprising:
  - a crossbar,
  - a pair of lower assembly arms extending from the crossbar,
  - a pair of mounting bases located at terminal ends of the pair of lower assembly arms, each mounting base equipped with a clamp mechanism for secure attachment to the personal utility device,
  - a width adjustment mechanism for adjusting the spacing of the pair of lower assembly arms; and,
  - a height adjustment mechanism for adjusting the height of the lower assembly relative to the personal utility device; and,
- a pair of upper angle supports connected to the pair of upper assembly arms, each upper angle support including a first central pivot hole and a plurality of angle adjustment holes;
- a pair of lower angle supports connected to the pair of lower assembly arms, each lower angle support including a second central pivot hole and a plurality of angle locking holes; and,
- a set of fasteners configured to align and secure the first central pivot holes to the second central pivot holes and the angle adjustment holes to the angle locking holes, enabling adjustable angular positioning of the upper assembly relative to the lower assembly.

2. The vertical support device of claim 1, wherein each clamp mechanism includes one or more of a friction fit, a threaded clamp, a temporary adhesive, a ratchet strap, or a mechanical fastener.

3. The vertical support device of claim 1, wherein the width adjustment mechanism and the height adjustment mechanism include sliding members and locking means to accommodate users of varying sizes and personal utility devices of different dimensions.

4. The vertical support device of claim 1, wherein the abdomen support sling is constructed from a flexible material to provide ergonomic support for a user's midsection during use.

5. The vertical support device of claim 1, wherein the pair of forearm supports are adjustable to allow a user to maintain a range of postures, including inclined and upright positions.

6. The vertical support device of claim 1, wherein the device is configured for integration with a treadmill and includes the pair of mounting bases adapted to attach to support arms of the treadmill.

7. The vertical support device of claim 1, wherein the device is configured for integration with a rolling walker and includes vertical uprights, a pair of larger rear tires, a single front tire, a seat, and a storage pouch.

8. The vertical support device of claim 1, wherein the set of fasteners are selected from the group consisting of bolts, screws, pins, and cotter pins.

9. The vertical support device of claim 1, wherein the plurality of angle adjustment holes and the plurality of angle locking holes allow for adjustment along an angular adjustment path to enable varying degrees of support for different exercise postures.

10. The vertical support device of claim 1, wherein the pair of hand grips and the pair of forearm supports are positioned to reduce impact on a user's lower body while facilitating spinal decompression during exercise.

* * * * *